Patented July 11, 1950

2,514,987

UNITED STATES PATENT OFFICE 2,514,987

PROCESS OF PREPARING 1,4-DIHYDROXY-DECAHYDRONAPHTHALENE

Alan Bell, Kingsport, Tenn., assignor to Eastman Kodak Company, Rochester, N. Y., a corporation of New Jersey No Drawing. Application February 4, 1949, Serial No. 74,694

1 Claim. (Cl. 260—617)

This invention relates to a new compound, 1,4-dihydroxy-decahydro naphthalene

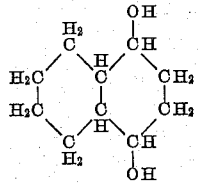

to a process of preparing it, and to certain of its esters. The compound may also be called decahydro-1,4-naphthalene diol, or decahydro-$\alpha$-naphthohydroquinone.

The 2,3- and 9,10-isomers of this compound have been known (Beilstein VI, 753 and VI, 2nd Erg., 759). However, the 1,4-compound had never been prepared.

I have discovered a process for preparing 1,4-dihydroxy-decahydro naphthalene, and have prepared this new compound and some of its derivatives.

5,8,9,10-tetrahydro naphthoquinone is prepared as shown in Richter's Organic Chemistry, vol. II (1939), page 175, from quinone and 1,3-butadiene by a Diels-Alder synthesis. It is then treated with a mixture of hydrochloric and glacial acetic acids, in a manner similar to that shown by Diels and Alder in Ber. 62, 2346, 2362, who used hydrobromic acid in glacial acetic acid. The same product is obtained as was obtained by Diels and Alder: namely, 1,4-dihydroxy-5,8-dihydro naphthalene (or 5,8-dihydroxy-1,4-dihydro naphthalene). The hydrogenation of 1,4-dihydroxy-5,8-dihydro naphthalene at 75° C. and 500 lbs. pressure has been reporetd by Diels and Alder, Ber. 62, 2361 (1929). This reaction produces 1,4-dihydroxy-5,6,7,8-tetrahydro naphthalene.

*Example I.—1,4-dihydroxy-decahydro naphthalene*

I prepare my new compound, 1,4-dihydroxy-decahydro naphthalene by catalytically hydrogenating 1,4-dihydroxy-5,8-dihydro naphthalene at 1000 pounds pressure or greater, at a temperature of approximately 125–150° C., in the presence of a finely divided nickel catalyst, such, for instance, as Raney nickel. For example, 350 grams of 1,4-dihydroxy-5,8-dihydro naphthalene was dissolved in about 1000 cc. of methanol and reduced at 125–150° C. for 6–10 hours under 1000–1500 pounds pressure with hydrogen, using Raney nickel as a catalyst. The resulting solution was colorless if kept under nitrogen, but was soon colored brown if exposed to air. It was filtered immediately after being taken out of the bomb, and the methanol was removed under reduced pressure in an atmosphere of nitrogen. The syrup thus obtained consisted of a mixture of the cis- and trans-isomeric forms of 1,4-dihydroxy decahydronaphthalene. By trituration of this syrup with ether and cooling, it is possible to isolate an ether-insoluble isomer which, after recrystallization from benzene, melts at 153° C. Analysis:

|   | Calculated for $C_{10}H_{18}O_2$ | Found |
|---|---|---|
| C | 70.5 | 69.9 |
| H | 10.7 | 11.0 |

The preparation of Raney nickel is described in U. S. Patents 1,563,587; 1,628,190 and 1,915,473.

*Example II.—1,4-diacetoxy-decahydronaphthalene*

The crude syrup containing the mixture of isomers, prepared in Example I, was refluxed for two hours with 1500 cc. of acetic anhydride. The cooled solution was poured into 3 liters of water. The resulting insoluble oil was separated (ether is used if necessary and the ether solution dried over $CaCl_2$) and distilled. The product is a pale yellow, very viscous oil, B. P. about 150° C./1–2 mm. Yield 400–450 grams. Analysis:

|   | Calculated for $C_{14}H_{22}O_4$ | Found |
|---|---|---|
| C | 66.2 | 66.5 |
| H | 8.7 | 8.9 |

*Example III.—1,4-diacetoxy decahydronaphthalene*

The ether insoluble isomer, melting at 153° C., mentioned in Example I, was acetylated by refluxing for two hours with five parts of acetic anhydride. The resulting oil crystallized after precipitation into water. It was recrystallized from naphtha; M. P. 69–70° C. Analysis:

|   | Calculated for $C_{14}H_{22}O_4$ | Found |
|---|---|---|
| C | 66.2 | 66.4 |
| H | 8.7 | 8.7 |

This is apparently one of the isomers, a mixture of which was prepared in Example II.

*Example IV.—1,4-dibutyroxy decahydronaphthalene*

150 grams of crude 1,4-dihydroxy-decahydro naphthalene, prepared as in Example I, was refluxed for four hours with 450 cc. of butyric anhydride. The cooled solution was poured into two liters of water. The resulting insoluble oil was separated, using ether as solvent, washed with $NaHCO_3$ solution and then with water, and finally dried over $CaCL_2$. The resulting oil was distilled. B. P. 175–180° C./1 mm.

1,4-diacetoxy decahydronaphthalene and 1,4-dibutyroxy decahydronaphthalene are useful as plasticizers for cellulose esters, as are the other 1,4-diacyloxy decahydro naphthalenes contemplated by the present invention.

What I claim as my invention and desire to be secured by Letters Patent of the United States is:

A process of preparing 1,4-dihydroxy-decahydronaphthalene, which comprises catalytically hydrogenating 1,4-dihydroxy-5,8-dihydro naphthalene at a pressure of at least 1000 lbs./sq. in. and a temperature of approximately 125–150° C., in the presence of finely divided nickel.

ALAN BELL.

REFERENCES CITED

The following references are of record in the file of this patent:

Schroeter, Berichte 71B, 1043, 1054–1056 (1938).
Campbell, Jour. Am. Chem. Soc. 63, 2726 (1941).